United States Patent
Negi

(10) Patent No.: US 8,166,024 B2
(45) Date of Patent: Apr. 24, 2012

(54) INFORMATION PROCESSING APPARATUS AND METHOD, PROGRAM, AND RECORDING MEDIUM

(75) Inventor: Daisuke Negi, Tokyo (JP)

(73) Assignee: Sony Corporation, Tokyo (JP)

( * ) Notice: Subject to any disclaimer, the term of this patent is extended or adjusted under 35 U.S.C. 154(b) by 767 days.

(21) Appl. No.: 12/193,969

(22) Filed: Aug. 19, 2008

(65) Prior Publication Data

US 2009/0055391 A1 Feb. 26, 2009

(30) Foreign Application Priority Data

Aug. 20, 2007 (JP) ................ P2007-213343

(51) Int. Cl.
*G06F 17/30* (2006.01)
(52) U.S. Cl. .................... 707/723; 707/749
(58) Field of Classification Search .......... 707/705–731, 707/736–741, 749–754
See application file for complete search history.

(56) References Cited

U.S. PATENT DOCUMENTS

| | | | |
|---|---|---|---|
| 2005/0246300 A1* | 11/2005 | Tsukamoto | 706/46 |
| 2007/0260580 A1* | 11/2007 | Omoigui | 707/2 |
| 2008/0097936 A1* | 4/2008 | Schmidtler et al. | 706/12 |

OTHER PUBLICATIONS

Microsoft Press Computer Dictionary, Microsoft Press, 3rd edition, defintion of "compute", p. 108 (1997).*
IBM Dictionary of Computing, McGraw Hill Inc, definition of "computing system". p. 132 (1994).*

* cited by examiner

*Primary Examiner* — Wilson Lee
(74) *Attorney, Agent, or Firm* — Finnegan, Henderson, Farabow, Garrett & Dunner, L.L.P.

(57) ABSTRACT

An information processing apparatus includes: an extracting means for extracting a feature volume from a predetermined content; and a computing means for computing an evaluation axis that classifies a first content and a second content by using a first feature volume extracted from the first content by the extracting means or a second feature volume extracted from the second content by the extracting means.

15 Claims, 12 Drawing Sheets

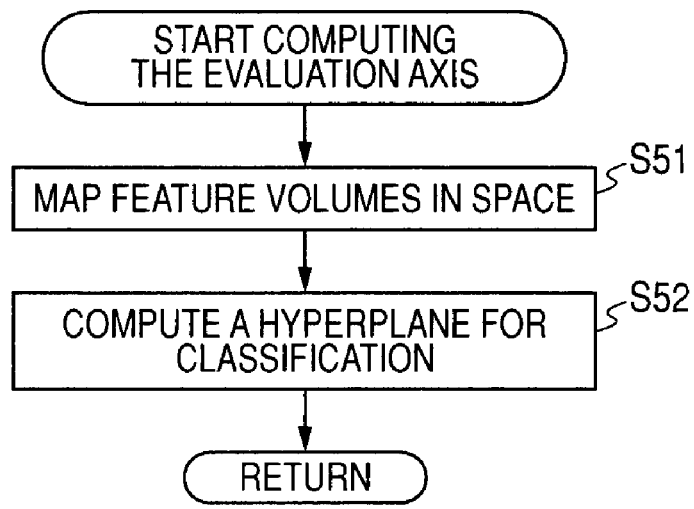
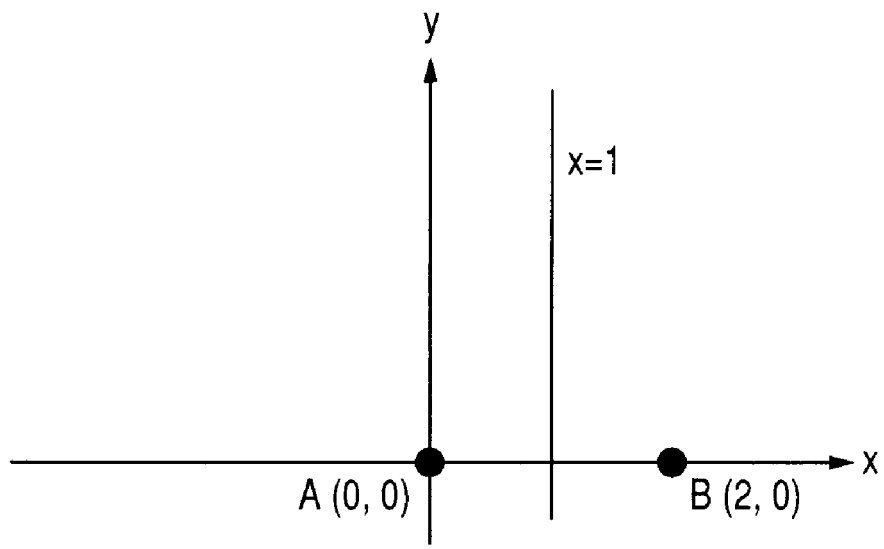

INFORMATION PROCESSING APPARATUS AND METHOD, PROGRAM, AND RECORDING MEDIUM

CROSS REFERENCES TO RELATED APPLICATIONS

The present invention contains subject matter related to Japanese Patent Application JP 2007-213343 filed in the Japanese Patent Office on Aug. 20, 2007, the entire contents of which being incorporated herein by reference.

BACKGROUND OF THE INVENTION

1. Field of the Invention

The present invention relates to an information processing apparatus and a method, a program, and a recording medium, particularly to an information processing apparatus and a method, a program, and a recording medium preferable for use in searching for contents.

2. Description of the Related Art

Heretofore, in the case in which a content such as a piece of music or a moving picture is searched over the Internet, a search is conducted according to keyword matching using a keyword or a tag associated with the content in advance. In addition, such methods are also proposed that a content is searched in units of video contents, and that a content is searched in units of scenes in which a video content is broken into smaller pieces (for example, see Patent Reference 1 (JP-A-2004-227423)).

SUMMARY OF THE INVENTION

Naturally, in the case in which a content is searched according to a keyword, a content with no keyword is not a search target. It is likely that a single content is given different keywords depending on people. Thus, in the case in which a search is conducted through contents with keywords, a content including no user specified keyword does not yield a search result even though that content is a content which is desired by a user to acquire as a search result, and consequently, the content may not be presented as a search result to the user.

Therefore, variations in keyword notation lead to an incomplete search, and it is likely that a content desired by a user may not be offered. In addition, in order to implement the search described above, a lot of efforts are necessary for a process for giving keywords.

In addition, such a system is also proposed that a natural language is used as a keyword to search for a content, including "up-tempo music", "red moving picture", and "moving picture with less motion", for example. However, since keywords (search terms) that can be specified are limited, no search can be conducted according to search terms not set as search terms, such as the search term "moving picture with red and white mixed". Therefore, in the system like this, since it is difficult to conduct a search according to a keyword desired by a user, only a limited search can be conducted.

In addition, for example, a plurality of users tags their contents with the same keywords. For example, individual users give the same keyword to their contents as follows; person A gives the keyword "child" to a content of his/her son videotaped, and person B also gives the keyword "child" to a content of his/her daughter videotaped. As described above, since individual users give keywords generally having the same meanings, they give keywords to a content of his/her child videotaped by the number of contents videotaping a child, for example. It is demanded that these similar taggings are conducted more simply, not tagging contents by individual users.

It is desirable to suitably conduct a search for a content.

An information processing apparatus according to an embodiment of the invention includes: an extracting means for extracting a feature volume from a predetermined content; and a computing means for computing an evaluation axis that classifies a first content and a second content by using a first feature volume extracted from the first content by the extracting means or a second feature volume extracted from the second content by the extracting means.

In the information processing apparatus, the computing means may map the first feature volume or the second feature volume, find from the mapped feature volume an equation of a hyperplane separating the first content from the second content, and set parameters of that equation to the evaluation axis.

In the information processing apparatus, the evaluation axis computed by the computing means may be stored as it is associated with a name indicating a content to be classified according to the evaluation axis.

In the information processing apparatus, the evaluation axis computed by the computing means may be used in searching through a plurality of contents for a content indicated by the name.

In the information processing apparatus, a content with a high relevance ratio to the evaluation axis may be a search result in searched contents.

In the information processing apparatus, the evaluation axis may be modified by being merged with a different evaluation axis.

In the information processing apparatus, the different evaluation axis may be an evaluation axis associated with a same name.

In the information processing apparatus, when a plurality of contents is classified according to the evaluation axis computed by the computing means, an unfitting content may be found in the classified content, and then that content is deleted, whereas a content may be found which is a fitting content but not included in a classified result, and then that content is added, and as the result of the deletion and addition of a content, an evaluation axis may be again computed from a plurality of contents remaining as a classified result to modify the evaluation axis.

An information processing method according to an embodiment of the invention includes the steps of: extracting a feature volume from a predetermined content; and computing an evaluation axis that classifies a first content and a second content by using a first feature volume extracted from the first content, or a second feature volume extracted from the second content.

A program according to an embodiment of the invention allows a computer to perform a process including the steps of: extracting a feature volume from a predetermined content; and computing an evaluation axis that classifies a first content and a second content by using a first feature volume extracted from the first content, or a second feature volume extracted from the second content.

A recording medium according to an embodiment of the invention records a program thereon. The program allows a computer to perform a process including the steps of: extracting a feature volume from a predetermined content; and computing an evaluation axis that classifies a first content and a second content by using a first feature volume extracted from the first content, or a second feature volume extracted from the second content.

In the information processing apparatus and the method, and the program according to the embodiments of the invention, the evaluation axis for classifying a content is computed by using a feature volume extracted from each of a plurality of contents.

According to the embodiments of the invention, a search for a content can be conducted more suitably.

BRIEF DESCRIPTION OF THE DRAWINGS

FIG. 10 shows a flow chart illustrative of the detail of computing the evaluation axis;

FIG. 11 shows a diagram illustrative of a manner of computing the evaluation axis;

DETAILED DESCRIPTION OF THE INVENTION

Hereinafter, embodiments of the invention will be described. The followings are examples of the correspondence between configuration requirements for the invention and the embodiments of the specification or the drawings. This is described for confirming that the embodiments supporting the invention are described in the specification or the drawings. Therefore, even though there is an embodiment that is described in the specification or the drawings but is not described herein as an embodiment corresponding to configuration requirements for the invention, it does not mean that the embodiment does not correspond to those configuration requirements. Contrary to this, even though an embodiment is described herein as an embodiment corresponding to configuration requirements, it does not mean that the embodiment does not correspond to configuration requirements other than those configuration requirements.

An information processing apparatus according to an embodiment of the invention is an information processing apparatus (for example, a PC 12 shown in FIG. 2) including: an extracting means (for example, a feature volume extracting part 32 shown in FIG. 2) for extracting a feature volume from a predetermined content; and a computing means (for example, an evaluation axis computing part 34 shown in FIG. 2) for computing an evaluation axis that classifies a first content and a second content by using a first feature volume extracted from the first content by the extracting means or a second feature volume extracted from the second content by the extracting means.

Hereinafter, an embodiment of the invention will be described with reference to the drawings.

1. System Configuration

Figure 1:
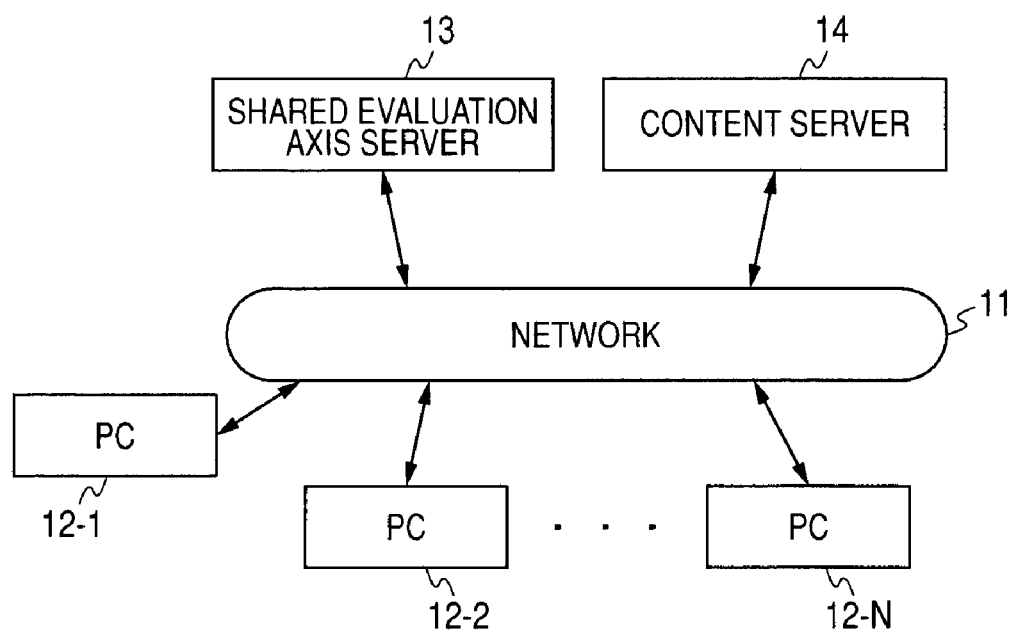
FIG. 1 shows a diagram depicting the configuration of an exemplary embodiment of a system to which an embodiment of the invention is adapted.

FIG. 1 shows a diagram depicting the configuration of an exemplary embodiment of a system to which an embodiment of the invention is adapted. To a network 11 including a LAN (Local Area Network) and the Internet, users' personal computers (PC) 12-1 to 12-N are connected. To the network 11, a shared evaluation axis server 13 and a content server 14 are also connected.

In the discussions below, in the case in which it is unnecessary to individually distinguish the PCs 12-1 to 12-N from each other, they are simply referred to as the PC 12. In addition, in FIG. 1, although a single shared evaluation axis server 13 and a single content server 14 are shown, of course, a plurality of these serves may be connected.

In the system shown in FIG. 1, for example, when a plurality of contents managed in the PC 12 is classified according to a predetermined keyword, information called an evaluation axis is created. For example, contents managed in the content server 14 are classified according to the evaluation axis, and a search is conducted for a content desired by a user. In addition, information about the evaluation axis can be shared by a plurality of users. For example, PC 12-2 user can use an evaluation axis created by PC 12-1 user to classify his/here contents or to search for a desired content.

Figure 2:
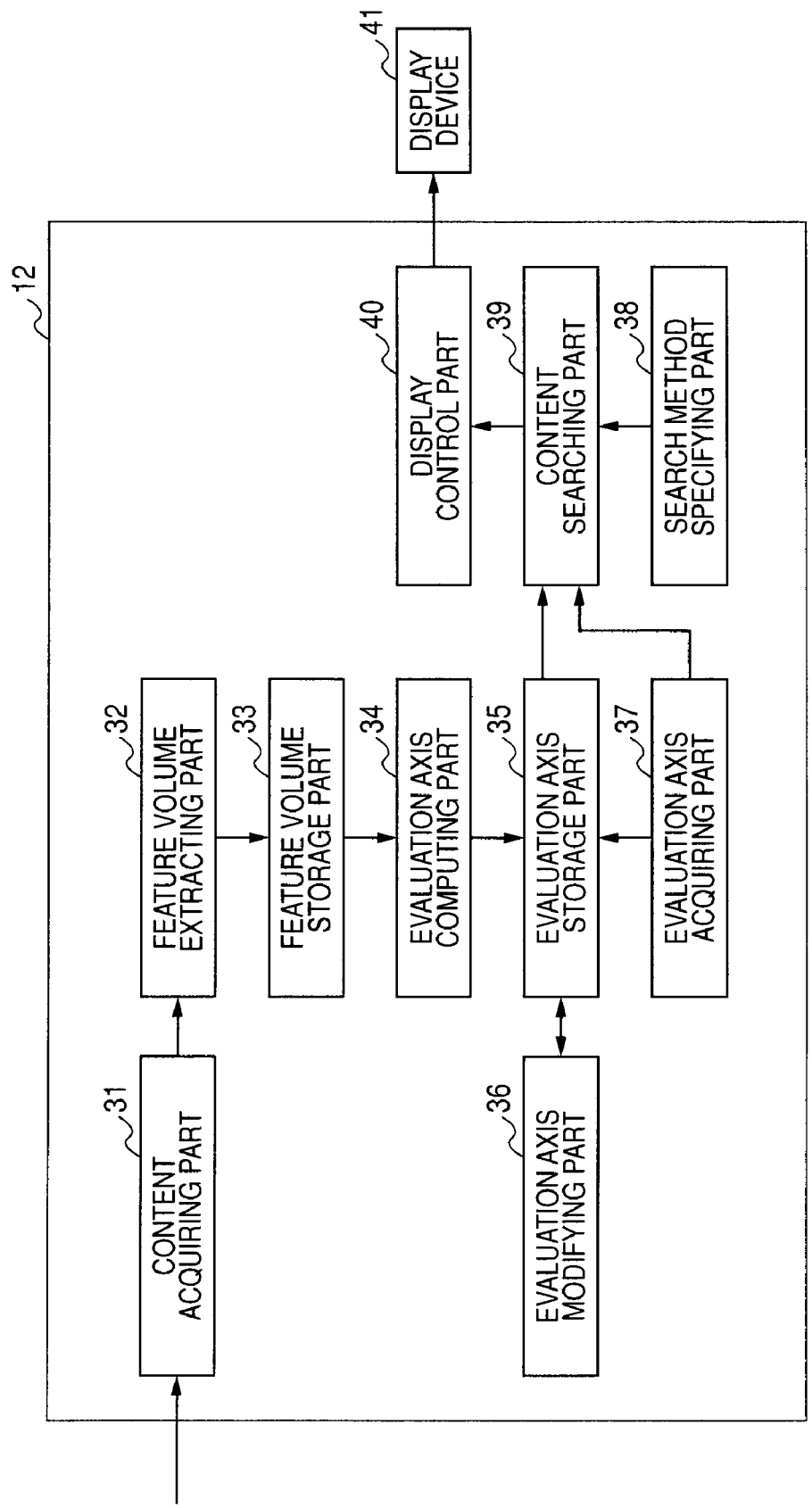
FIG. 2 shows a diagram depicting the functions of a PC.

FIG. 2 shows a block diagram depicting the functions of the PC 12. The PC 12 is configured to include a content acquiring part 31, a feature volume extracting part 32, a feature volume storage part 33, an evaluation axis computing part 34, an evaluation axis storage part 35, an evaluation axis modifying part 36, an evaluation axis acquiring part 37, a search method specifying part 38, a content searching part 39, and a display control part 40. In addition, to the PC 12, a display device 41 is connected in which display is controlled by the display control part 40.

The content acquiring part 31 acquires a content. The content acquiring part 31 acquires a content managed in a different apparatus such as the content server 14 connected over the network 11 and a content managed in the PC 12. The content to be acquired may be a content published on the Internet, or may be a private content taken by a user him/herself.

The feature volume extracting part 32 extracts a feature volume from the content acquired by the content acquiring part 31. The feature volume extracted by the feature volume extracting part 32 is temporarily stored in the feature volume storage part 33.

Although the detail will be described later, the evaluation axis computing part 34 computes an evaluation axis for use in classifying contents. The computed evaluation axis is stored in the evaluation axis storage part 35. The evaluation axis once computed and stored in the evaluation axis storage part 35 is configured to be again modified by a user, and the evaluation axis modifying part 36 performs this modification.

The evaluation axis acquiring part 37 acquires an evaluation axis managed in a different apparatus, for example, one managed in the shared evaluation axis server 13. The evaluation axis acquired by the evaluation axis acquiring part 37 is stored in the evaluation axis storage part 35, or supplied to the content searching part 39.

The search method specifying part 38 is configured to include a manipulating part (not shown) such as a keyboard and a mouse which can be operated by a user, in which the search method specifying part 38 accepts an input such as a keyword (text), an image, and a video when a user searches for a desired content and instructs the content searching part 39 to conduct a search according to the inputted search method.

The content searching part 39 conducts a search for a content desired by a user according to the method instructed by the search method specifying part 38, or by using the evaluation axis stored in the evaluation axis storage part 35 or/and the evaluation axis acquired by the evaluation axis acquiring part 37. The search result is supplied to the display control part 40. The display control part 40 controls the display device 41 to offer the search result to a user.

The evaluation axis may be created on the PC 12 side and supplied to the shared evaluation axis server 13, or may be acquired from the shared evaluation axis server 13. Next, the shared evaluation axis server 13 will be described.

Figure 3:
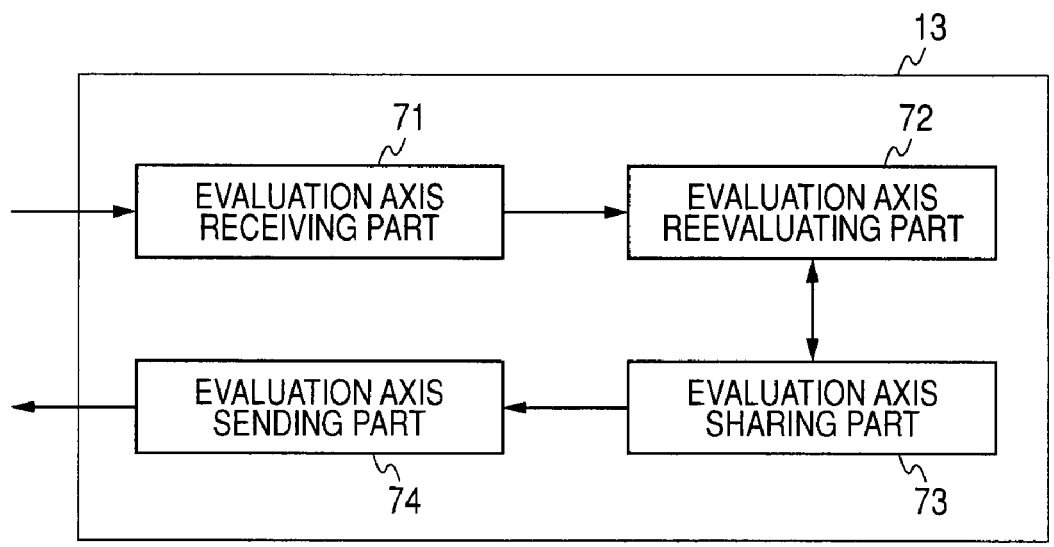
FIG. 3 shows a diagram depicting the functions of a shared evaluation axis server.

FIG. 3 shows a block diagram depicting the shared evaluation axis server 13. The shared evaluation axis server 13 is configured to include an evaluation axis receiving part 71, an evaluation axis reevaluating part 72, an evaluation axis sharing part 73, and an evaluation axis sending part 74.

The evaluation axis receiving part 71 receives an evaluation axis supplied from the PC 12, and provides it to the evaluation axis reevaluating part 72. The evaluation axis reevaluating part 72 determines whether the provided evaluation axis is already stored in the evaluation axis sharing part 73, or whether it is necessary to modify the evaluation axis already stored with the evaluation axis newly provided, and supplies the modified evaluation axis to the evaluation axis sharing part 73 to store it therein, as necessary.

As described later, the evaluation axis sharing part 73 manages an evaluation axis as the evaluation axis is associated with a name given thereto, and supplies the stored evaluation axis in response to a request from a user (the PC 12). The evaluation axis sending part 74 sends the evaluation axis to the PC 12.

Figure 4:
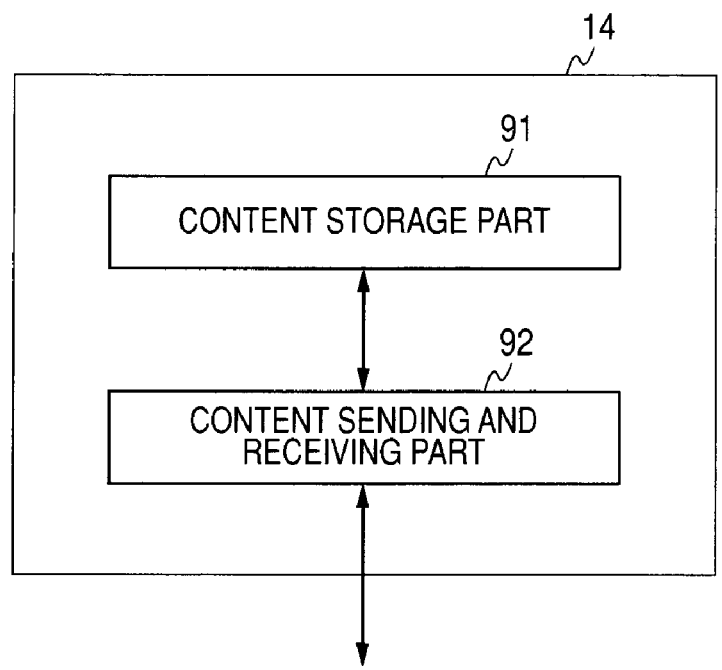
FIG. 4 shows a diagram depicting the functions of a content server.

FIG. 4 shows a block diagram depicting the functions of the content server 14. The content server 14 is configured to include a content storage part 91 and a content sending and receiving part 92. The content storage part 91 stores therein a plurality of contents. The content sending and receiving part 92 receives a content supplied from a different apparatus over the network 11, and stores it in the content storage part 91 or sends a content stored in the content storage part 91 to a different apparatus.

Here, the shared evaluation axis server 13 and the content server 14 are described as they are different apparatuses, but they may be the same apparatus. In other words, for example, such a configuration may be possible that the shared evaluation axis server 13 is also provided with the functions of storing contents therein and sending contents. In addition, the functions of creating an evaluation axis and conducting a content search with the evaluation axis, described later, which are provided to the PC 12, may be provided to the shared evaluation axis server 13 and the content server 14.

Figure 5:
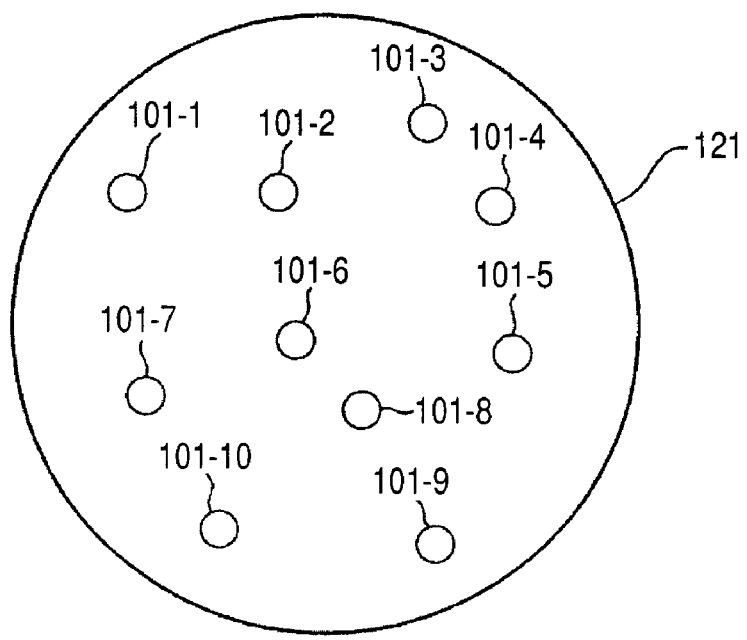
FIG. 5 shows a diagram illustrative of an evaluation axis.

Here, the evaluation axis will be described. FIG. 5 shows a diagram schematically depicting the manner of dispersion of contents. For example, suppose that the manner of dispersion is the state when contents are distributed in accordance with a predetermined feature volume or keyword of a content. Suppose that the number of contents shown in FIG. 5 is ten contents, contents 101-1 to 101-10, and the discussion is continued. In addition, suppose that these contents 101-1 to 101-10 are contents stored in the PC 12, or contents stored in the content server 14.

Figure 6:
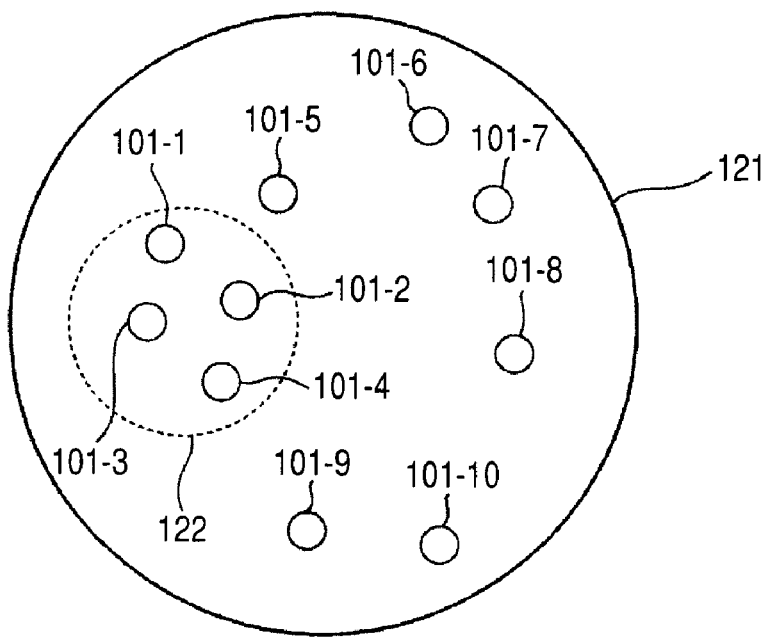
FIG. 6 shows a diagram illustrative of the evaluation axis.

Here, suppose that a content group of the contents 101-1 to 101-10 is a group 121. As shown in FIG. 5, suppose that the contents 101-1 to 101-10 are classified according to a predetermined keyword by a user in the case in which the content group of the contents 101-1 to 101-10 belongs to the group 121. As the result of classification, as shown in FIG. 6, a new group 122 is created in the group 121.

The group 122 includes the contents 101-1 to 101-4. For example, when a user classifies a video of videotaping his/her child into the group 122, the video is classified into the group 122 because the contents 101-1 to 101-4 fall in a video of videotaping a child. With such classification, the content group belonging to the group 121 is classified into a content group belonging to the group 122 and a content group not belonging to the group 122.

Figure 7:
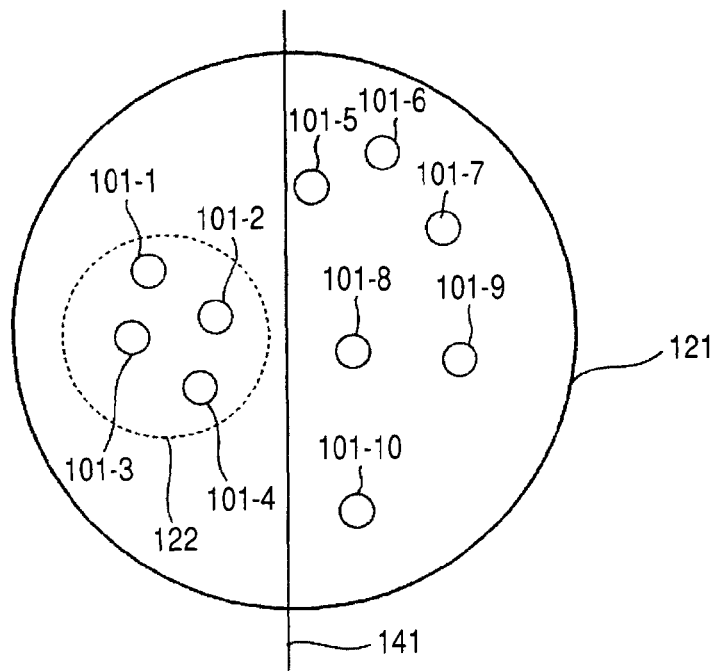
FIG. 7 shows a diagram illustrative of the evaluation axis.

In the case in which such classification is made, as shown in FIG. 7, a single evaluation axis 141 can be created. In other words, in this case, the evaluation axis 141 can be created which separates contents into the contents belonging to the group 122 and the contents not belonging to the group 122. For example, in the case in which the evaluation axis 141 is the evaluation axis 141 created when videos of videotaping a child (contents relating to a child) are classified, the evaluation axis 141 is an evaluation axis 141 that can be used when a content relating to a child is classified.

In other words, for example, in FIG. 7, on the left side of the evaluation axis 141 in the drawing, there are the contents relating to a child, and on the right side of the evaluation axis 141 in the drawing, there are the contents other than the contents relating to a child. Therefore, in this case, according to the evaluation axis 141, contents are separated into two content groups, a group of the contents relating to a child and a group of the contents other than those contents.

When a user desires to extract a content relating to a child among the contents managed by the user, the user uses the evaluation axis 141 to classify his/here contents. As described above, since the classified result is classified into the contents relating to a child and the contents other than those contents, the user can extract a desired content relating to a child from the contents relating to a child. In addition, when another user (suppose that the user is user B) uses information about the evaluation axis 141 created by user A to classify his/here contents, user B can similarly classify his/here contents into the contents relating to a child and the other contents.

Figure 8:
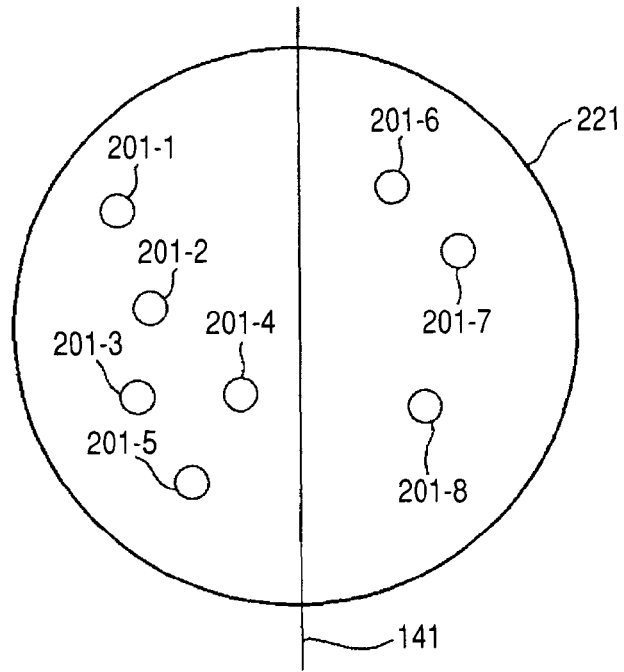
FIG. 8 shows a diagram illustrative of the evaluation axis.

In other words, for example, in the case in which user B has contents 201-1 to 201-8 shown in FIG. 8, user B uses the evaluation axis 141 created by user A for classifying the contents relating to a child to classify his/here contents into the contents 201-1 to 201-5 relating to a child and the contents 201-6 to 201-8 which are not the contents relating to a child.

As described above, the evaluation axis 141 is used to classify contents. When the evaluation axis 141 is shared in the shared evaluation axis server 13, for example, the evaluation axis 141 created by user A is registered in the shared evaluation axis server 13, and the user B acquires the registered evaluation axis 141, whereby user B can modify his/here contents.

In addition, the evaluation axis 141 registered in the shared evaluation axis server 13 is modifiable. For example, in the case in which user A creates an evaluation axis 141 with the name "child" and registers it in the shared evaluation axis server 13 and user B as well creates an evaluation axis 141' with the name "child" and registers it in the shared evaluation axis server 13 (in order to distinguish between the names of the evaluation axes 141 created by user A and by user B, a prime (') is given to one created by user B), since these evaluation axes have the same name "child", the evaluation axis 141 and the evaluation axis 141' may be used to create a new evaluation axis with the name "child" (the evaluation axis 141 is modified by using the evaluation axis 141').

With such modification, more suitable evaluation axis can be made for classifying a predetermined content. In addition, a user can modify the evaluation axis 141 acquired from the shared evaluation axis server 13 or the evaluation axis 141 created by the user him/herself to an evaluation axis suitable to classifying his/here contents, as necessary.

Figure 9:
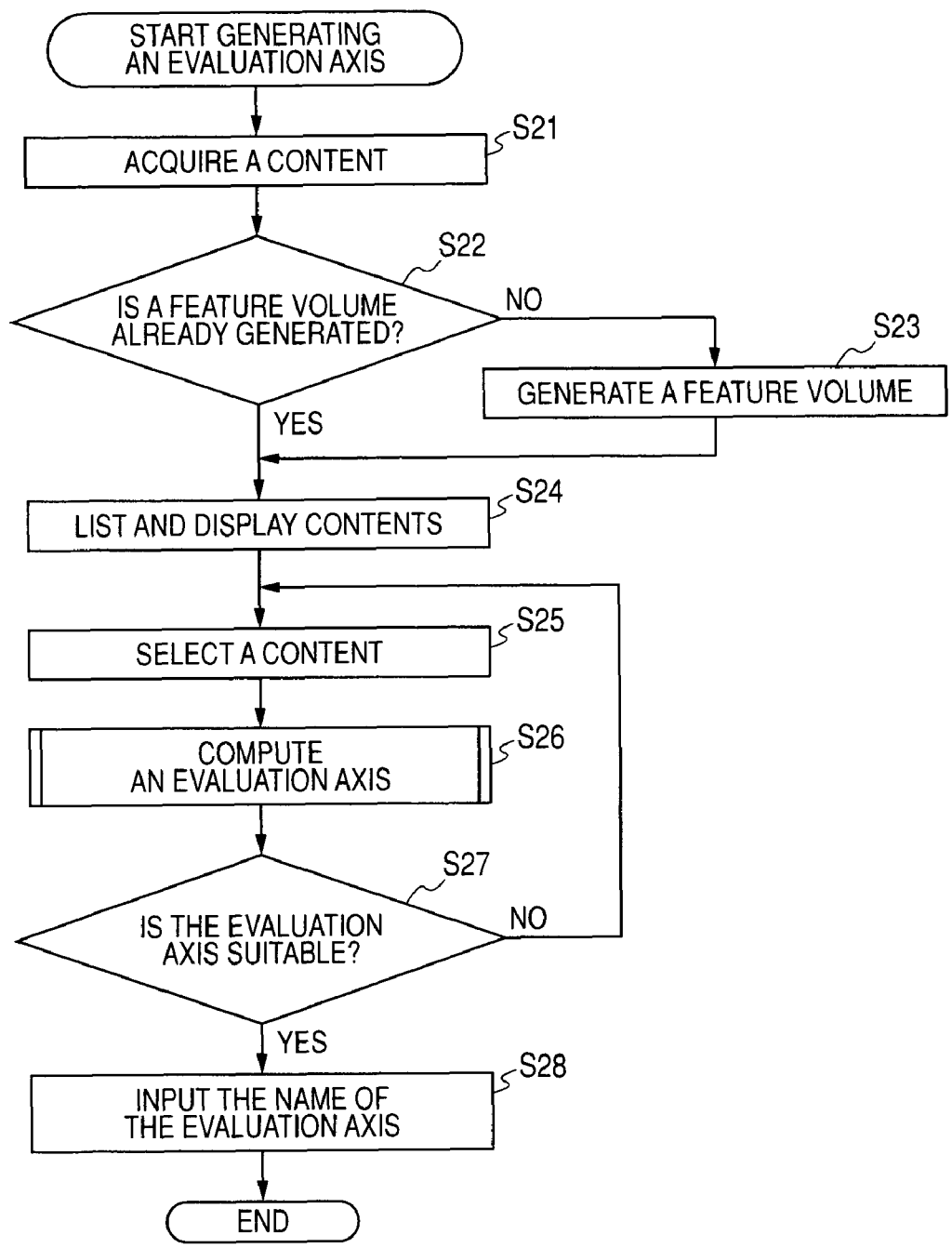
FIG. 9 shows a flow chart illustrative of computing an evaluation axis.

Next, the creation and modification of the evaluation axis, and the content search using the evaluation axis will be described. First, the creation of the evaluation axis will be described with reference to a flow chart shown in FIG. 9.

In Step S21, the content acquiring part 31 of the PC 12 (FIG. 2) acquires a content from the contents managed in a storage part in the PC 12 (not shown) or in a different apparatus (for example, the content server 14) connected to the network 11. The content acquired by the content acquiring part 31 is supplied to the feature volume extracting part 32.

In Step S22, the feature volume extracting part 32 determines whether a feature volume is already generated from the acquired content. If a feature volume is generated, since that feature volume is stored in the feature volume storage part 33, the feature volume extracting part 32 determines whether the feature volume related to the supplied content is stored in the feature volume storage part 33, whereby the feature volume extracting part 32 performs a determination process in Step S22.

In Step S22, if the feature volume extracting part 32 determines that no feature volume is generated from the supplied content yet, the process goes to Step S23. In Step S23, the feature volume extracting part 32 extracts the feature volume of the supplied content, and stores it in the feature volume storage part 33 together with information that can uniquely identify the content.

In the case in which the content is a video, for example, for the feature volume, there are a color histogram, a luminance histogram, face recognition data (the number of people), an artifact or a natural object (the number of straight lines, and the complexity of video), the intensity of motion, the motion of a camera (panning, zooming, and tilt), the frequency of camera shake, and the frequency of cut changes. In addition, in the case in which the content is sounds, or in the case in which the content includes sounds and a feature volume is extracted as attention is focused on these sounds, for the feature volume, sound levels, music and speech (male voice, female voice, and mixed voices), voice recognition results, and frequency responses.

Only one of these feature volumes may be extracted from a single content, or a plurality of feature volumes may be extracted.

Moreover, an evaluation axis is computed in the later process step, and the feature volume to be extracted is a feature volume necessary to suitably compute that evaluation axis. In addition, the computed evaluation axis and the feature volume are used to conduct a search for a content, and the feature volume to be extracted is a feature volume necessary to suitably conduct that search.

For example, in the case in which the evaluation axis named with "child" is created as described above, it is necessary to create an evaluation axis to suitably classify videos with a child and videos with no child. In this case, since such a feature volume is necessary that a child on videos can be suitably extracted, for example, a feature volume such as face recognition data or the intensity of motion is extracted.

In addition, generally, it can be considered that a child video is a video taken in the home, and videos taken in the home are videos taken with a video camera. Therefore, it can be considered that these videos have a greater frequency of camera shake than television broadcast programs have. Thus, the frequency of camera shake may be extracted as a feature volume.

As described above, in consideration of the content to be classified, a suitable feature volume is extracted.

In Step S23, the feature volume extracting part 32 generates (extracts) a feature volume, and then that feature volume is associated with information for identifying the content, for example, an ID given to the content, and then stored in the feature volume storage part 33. Moreover, the feature volume storage part 33 may store therein data of the content itself. In addition, the feature volume storage part 33 may store therein an address of the storage part storing the content therein, and this address may be an address for identifying a content stored in a different apparatus connected to the network 11.

The process in Step S23 is finished, and then the process goes to Step S24. The process as well goes to Step S24, when it is determined in Step S22 that a feature volume is already extracted from the supplied content.

In addition, here, although the process is continuously described as a sequence of a flow, the processes from Steps S21 to S23 and the processes after Step S24 may not be the processes in a sequence of a flow, which may be performed at separate timings. In other words, the processes from Steps S21 to S23 are repeated, whereby feature volumes of a plurality of contents are stored in the feature volume storage part 33. Then, the feature volume stored in the feature volume storage part 33 is used to perform the processes after Step S24. To this end, the process for storing the feature volume and the process using the feature volume can be performed at separate timings.

In Step S24, the contents are listed for display. Under control performed by the display control part 40, the listing of contents to be processing targets is displayed on the display device 41. For example, the contents to be processing targets are contents stored in the storage part of the PC 12 (not shown) and contents stored in the content server 14 (FIG. 1). Information displayed is the name and the date of a shoot of a content, for example. In addition, the feature volumes of the contents for the listing are already generated and stored in the feature volume storage part 33.

In Step S25, a user selects a content to acquire information about the selected content. For example, the user selects a content group relating to a child, a content group of favorite programs, a content group of songs of a favorite singer, and content group of favorite moving pictures. For the user, this selection is a selection of a content group with a predetermined tendency, which may be a selection with a tendency difficult to express explicitly by words. The information about the selected content (for example, information such as an ID for uniquely identifying a content) is supplied to the evaluation axis computing part 34.

In Step S26, the evaluation axis computing part 34 computes an evaluation axis. The process for computing the evaluation axis in Step S26 will be described later with reference to a flow chart shown in FIG. 10. The evaluation axis is computed, and then the process goes to Step S27. In Step S27, it is determined whether the computed evaluation axis is a suitable evaluation axis. The suitable evaluation axis is an evaluation axis that can suitably classify the selected content and the content not selected. In other words, the suitable evaluation axis is an evaluation axis that can suitably express the selected content.

In Step S27, if it is determined that a suitable evaluation axis is not computed, the process returns to Step S25, and the processes after that are repeated. On the other hand, in Step S27, if it is determined that a suitable evaluation axis is computed, the process goes to Step S28.

In Step S28, the name of the evaluation axis is given. If it is determined that a suitable evaluation axis is computed, for example, a message saying that "please name it" is shown to a user, and in response to that message, the user manipulates the manipulating part such as a keyboard (not shown) to input a name (text data), and then the name is acquired. The evaluation axis computing part 34 associates the name given by the user with the computed evaluation axis, and stores them in the evaluation axis storage part 35.

Next, in step 26, the process for computing the evaluation axis will be described with reference to a flow chart shown in FIG. 10.

In Step S51, the feature volumes of a plurality of contents are mapped in space. The feature volume of the content is configured of a multi-dimensional numeric value (a feature volume vector). In other words, in the process in Step S23, the feature volume generated from a predetermined content is configured of a multi-dimensional numeric value (a feature volume vector). The values in the individual dimensions are regarded as coordinates, whereby a single content can be mapped at one point in an N-dimensional space.

As described above, in Step S51, an N-dimensional numeric value is regarded as a coordinate, and then a plurality of contents is each mapped at a single point in the N-dimensional space separately.

Moreover, as described above, for the feature volume, in the case in which the content is a video, it is likely that a plurality of feature volumes such as a color histogram, a luminance histogram, and face recognition data is generated from a single content. With regard to which feature volume is used for mapping among a plurality of the feature volumes, it is sufficient to select a feature volume necessary to create a suitable evaluation axis. For example, in the case in which the content selected by a user is a content selected based on user's favorite color, a feature volume such as a color histogram or a luminance histogram may be selected, and in the case in which the content selected by a user is a content relating to a child, a feature volume such as face recognition data may be selected. The feature volume to be selected may be a single feature volume, or may be a plurality of feature volumes. In the case in which no determination is made which feature volume is used, all the feature volumes may be used.

In addition, in the case in which a predetermined feature volume is used for mapping and the mapped result is used to compute an evaluation axis but it is difficult to suitably classify contents according to the evaluation axis, or in the case in which selected contents are scattered and it is difficult to compute a single evaluation axis, such a process may be performed that contents are again mapped with another feature volume to recompute the evaluation axis. For example, in the flow chart shown in FIG. 9, in Step S27, it is determined whether the evaluation axis is suitable, and if it is determined that it is not suitable, the process returns to Step S25 to again compute an evaluation axis. In again computing an evaluation axis, it is sufficient that another feature volume is used for performing the process.

Again referring to the flow chart shown in FIG. 10, the content is mapped in Step S51, and then in Step S52, a hyperplane for classification is computed. The process in Step S52 is a process for computing a hyperplane for classification which can most excellently classify a coordinates group expressing the contents selected by the user group and a coordinates group expressing the other content group. In other words, for example, as discussed with reference to FIG. 7, such a hyperplane for classification is computed that it can classify the group 122 including the contents 101-1 to 101-4 selected by the user (in this case, it correspond to the content group selected by the user) and the other content group. In the example shown in FIG. 7, the hyperplane to be computed is the evaluation axis 141.

In addition, here, "the evaluation axis" is described, and the representation "axis" is used for the evaluation axis because contents are mapped in the N-dimensional space and the process is performed in the N-dimensional space. However, the axis may be a plane existing in space depending on dimensions.

In other words, since the hyperplane of the N-dimensional space is expressed by an (N−1) dimensional equation, the (N−1) dimensional equation itself is the evaluation axis. For example, in the case in which contents are mapped in the two-dimensional space (plane) as shown in FIG. 7, the feature volume is a feature volume two dimensionally expressed. Then, the hyperplane to be computed from this feature volume is one dimensional, and contents are classified into two categories according to a linear hyperplane, that is, a straight line. In addition, for example, three dimensional space is classified into two categories by a two dimensional hyperplane (plane).

As described above, the hyperplane is found by the information about the contents mapped in the N-dimensional space, and then an evaluation axis is computed. In addition, the hyperplane is computed by applying a method such as discriminant analysis. In addition, desirably, the method of computing the hyperplane (a manner of computing the evaluation axis) is a method that can compute a relevance ratio how much the content is relevant, not a method of classifying contents into two classes whether to be relevant to the evaluation axis.

The processes in Steps S51 and S52 will be described again with reference to FIG. 11. In the discussion with reference to FIG. 11, the feature volume is two dimensional, where feature volume of content A is (0, 0) and the feature volume of content B is (2, 0). At this time, as shown in FIG. 11, the feature volumes of these contents A and B are mapped at a coordinate value (0,0) and a coordinate value (2,0) on an xy coordinate plane.

After this mapping, a hyperplane is found. Since the hyperplane in the two dimensional feature volume space in which the two dimensional feature volumes are mapped is expressed by a linear equation. As shown in FIG. 11, in the case in which the content A and the content B are mapped, the equation of the hyperplane is x=1. Referring to FIG. 11, it is shown that the straight line x=1 classifies the content A (the coordinate value (0, 0)) and the content B (the coordinate value (2, 0)).

In addition, here, the equation x=1 is the equation that classifies the content A and the content B, but there are other equations that can classify contents, and the equation is not necessarily limited to the equation x=1. Therefore, a determining process is provided whether it is an evaluation axis (equation) yielding a suitable classification, and it is better to provide a scheme that can again conduct a review of the evaluation axis in the case in which it is found that the evaluation axis may not yield a suitable classification. In the embodiment, as described above, the process in Step S27 (FIG. 9) is provided to implement this scheme.

Generally, the linear equation can be expressed by ax+by+c=0, and a single straight line can be uniquely determined by parameters (a, b, c). When the straight line x=1 shown in FIG. 11 is depicted in this form, then the parameters (a, b, c) are:

$$(a,b,c)=(1,0,-1)$$

A set of the values of these parameters (a, b, c) can be an evaluation axis. In this case, the determined evaluation axis is (1, 0, −1).

As described above, the evaluation axis can be depicted by the parameters expressing an equation on the hyperplane.

Of course, the hyperplane may be found as described above to determine the evaluation axis, or only the selected feature volumes of the contents (the information) may be used to determine the tendency of the feature volumes shown in common with these contents for setting the determined result to the evaluation axis.

Figure 12:
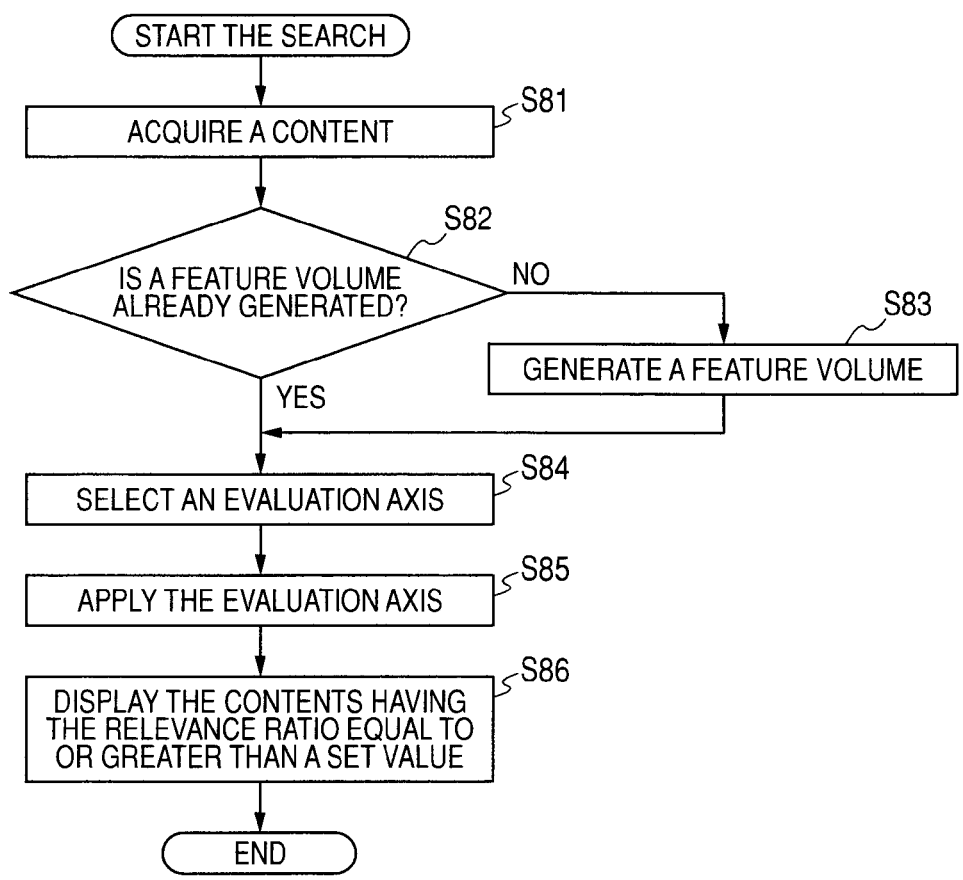
FIG. 12 shows a flow chart illustrative of a content search.

As discussed above, the evaluation axis thus determined is stored in the evaluation axis storage part 35 (FIG. 2), or supplied to the shared evaluation axis server 13 over the network 11 for sharing the evaluation axis. Next, the content search using the evaluation axis stored in the evaluation axis storage part 35 or the evaluation axis shared in the shared evaluation axis server 13 will be described with reference to a flow chart shown in FIG. 12.

In Steps S81 to S83, a content is acquired, and it is determined whether a feature volume is already computed from that acquired content. If it is determined that no feature volume is computed yet, a feature volume is generated. The processes in Steps S81 to S83 are basically similar to the processes in Steps S21 to S23 shown in FIG. 9, omitting the descriptions.

The processes in Steps S81 to S83 are performed to acquire the feature volume of the content to be a search target. In addition, the content related to the feature volume stored in the feature volume storage part 33 and the content stored in the content server 14 are also search targets.

In Step S84, an evaluation axis is selected. The evaluation axis to be a selection target is the evaluation axis stored in the evaluation axis storage part 35 and the evaluation axis shared in the shared evaluation axis server 13. For example, the listing of the evaluation axes stored in the evaluation axis storage part 35 is displayed on the display device 41, and then a user selects a desired evaluation axis from the listing of the evaluation axes displayed. For instance, this selection is inputted by manipulating the manipulating part such as the keyboard configuring the search method specifying part 38.

Based on the information supplied from the search method specifying part 38, the content searching part 39 reads an evaluation axis out of the evaluation axis storage part 35. In the case in which an evaluation axis stored in the shared evaluation axis server 13 is selected, by the process performed by the evaluation axis acquiring part 37, the evaluation axis is acquired from the shared evaluation axis server 13, and supplied to the content searching part 39.

In Step S85, the content searching part 39 applies the evaluation axis read out of the evaluation axis storage part 35, or the evaluation axis acquired by the evaluation axis acquiring part 37 to classify the content.

The content is mapped in the N-dimensional space based on the feature volume, and the mapped content is classified depending on which side of the evaluation axis the mapped content exists. Again referring to FIG. 8, the evaluation axis 141 is applied when the contents 201-1 to 201-8 are mapped in the two-dimensional space as shown in FIG. 8, and then these contents are classified into a content group of the contents 201-1 to 201-5 and a content group of the contents 201-6 to 201-8. In other words, the contents are classified into the content group positioned on the right side of the evaluation axis 141 in the drawing and the content group positioned on the left side.

In the case in which the content group on the left side of the evaluation axis 141 in the drawing is presented as the search result to a user, the contents 201-1 to 201-5 are presented as the search result to the user.

As described above, the contents to be presented to a user may be decided from the positional relationship between the evaluation axis and the mapped contents according to the feature volume. However, in addition to simply presenting the information about a plurality of contents, for example, such a scheme may be possible that to the content desired by a user, the relevance ratio is computed which shows how much the content is fit, and the contents are presented to the user in order of the relevance ratio.

In Step S86, the content having the relevance ratio equal to or greater than a set value is presented to the user. For example, again referring to FIG. 8, in the case in which it is determined that the content 201-1 mapped at the farthest position from the evaluation axis 141 has the highest relevance ratio, the content 201-1 is presented to a user as the content having the highest relevance ratio. In addition, in contrast to this, although the content 201-4 is the content to be presented as the search result to the user because the content 201-4 exists on the left side of the evaluation axis 141 in the drawing, in the case in which the content 201-4 has a lower relevance ratio and this relevance ratio is smaller than a threshold set in advance because the content 201-4 is at the position close to the evaluation axis 141, the content 201-4 is not presented to the user side.

As described above, in Step S86, the relevance ratio is computed, and the content having the relevance ratio equal to or greater than a set value is presented to the user side. When presented, a process for sorting contents may be performed as necessary in such a way that the contents are presented to the user side in descending order of the relevance ratio.

Figure 13:
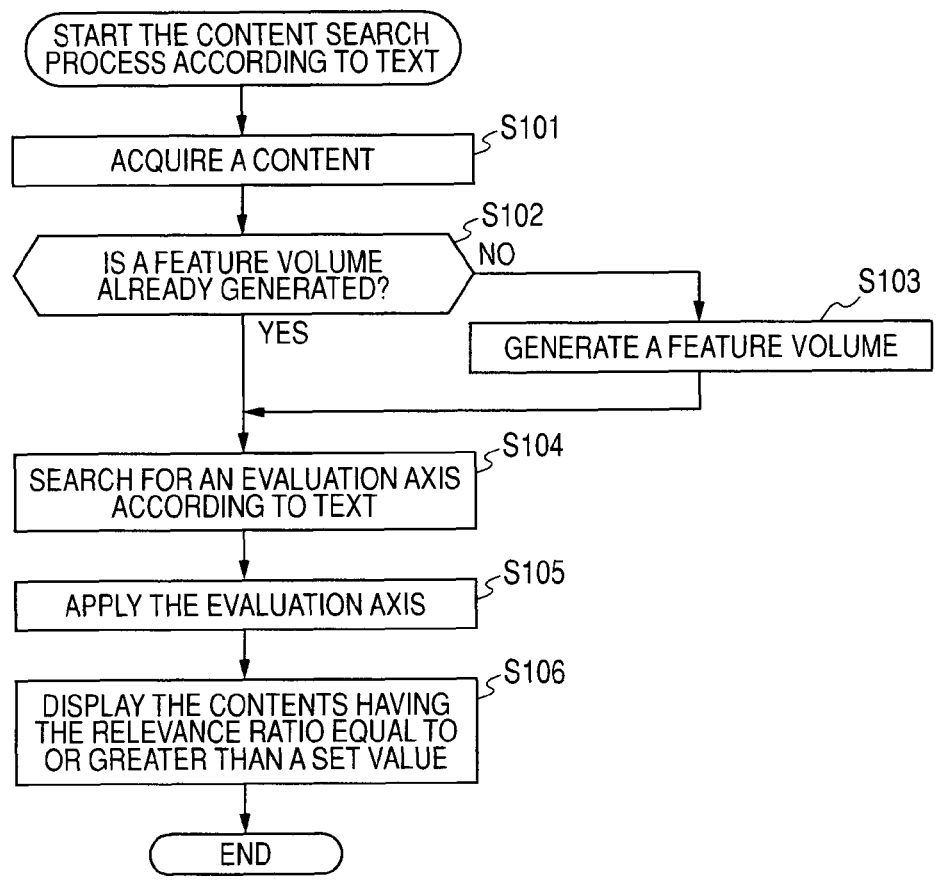
FIG. 13 shows a flow chart illustrative of a content search.

Next, the search process will be described with reference to a flow chart shown in FIG. 13 as an example is taken in which a search method is performed according to text. The processes in Steps S101 to S103 are the processes similar to the processes from Steps S21 to S23 shown in FIG. 9, omitting the descriptions.

In Step S104, an evaluation axis is searched according to text. As described above, the evaluation axis is given a name, associated with this name, and stored together with the name when stored in the evaluation axis storage part 35. This name is used to search for an evaluation axis. In other words, a user inputs text, a name matched with or similar to the inputted text is searched, and the evaluation axis associated with the searched name is read. In the search for the evaluation axis, the evaluation axes stored in the evaluation axis storage part 35 as well as the evaluation axes stored in the shared evaluation axis server 13 are search targets. In addition, to the search targets, such a scheme is also provided that a user can set a range for the search targets.

In Step S105, the searched evaluation axis is applied to conduct a search for a content desired by the user. The process in Step S105 and the subsequent process in Step S106 are processes similar to the processes in Steps S85 and S86 in FIG. 12, omitting the descriptions.

As described above, the user inputs a keyword related to a content desired to search as text, an evaluation axis determined based on the text is searched, whereby the content search is conducted according to the evaluation axis, and thus, a desired content can be acquired.

Figure 14:
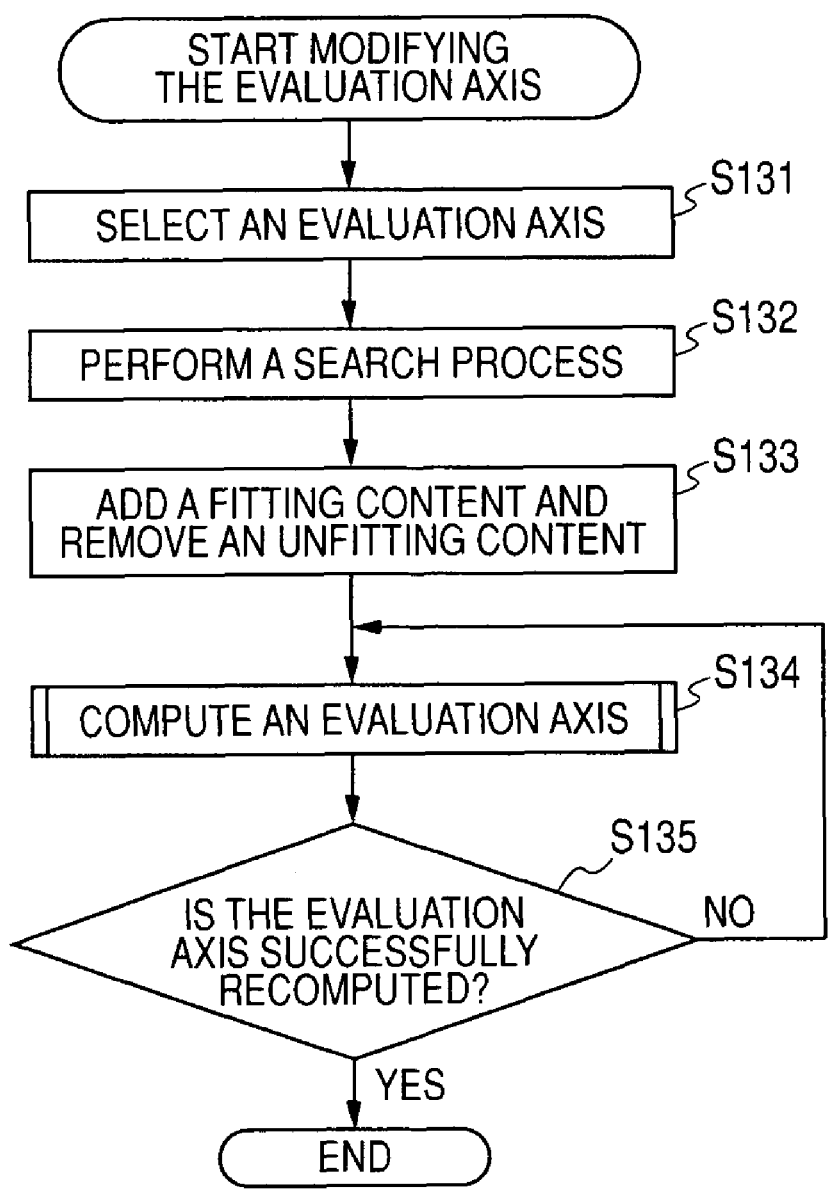
FIG. 14 shows a flow chart illustrative of modifying the evaluation axis.

As described above, in the case in which the content search is conducted according to the evaluation axis, in order to improve the accuracy of this search, it is necessary to increase the suitability of the evaluation axis itself. Then, in order to improve the evaluation axis once computed according to the process described above to be a more suitable evaluation axis, such a scheme is provided that the evaluation axis can be modified. The manner of modifying an evaluation axis will be described with reference to a flow chart shown in FIG. 14.

In Step S131, an evaluation axis to be a modification target is selected. The evaluation axis to be a modification target is the evaluation axes managed in the shared evaluation axis server 13 and the evaluation axes stored in the evaluation axis storage part 35. First, for example, a listing of the evaluation axes is displayed. Preferably, the listing displayed is a listing in which evaluation axes are visibly categorized in individual genres. Then, a user selects an evaluation axis desired to modify from the listing of the displayed evaluation axes. Then, information for identifying that selected evaluation axis is as well supplied to the evaluation axis modifying part 36 (FIG. 2), whereby the process in Step S131 is performed.

In Step S132, a search process using the selected evaluation axis is performed. For example, this search process is the process described with reference to the flow chart shown in FIG. 12. Here, the descriptions are omitted.

In Step S133, a fitting content is added, and an unfitting content is deleted. The search process is performed in Step S132 to present the search result to the user side. In the case in which the presented content group includes a content that is determined as an unfitting one by the user, the content determined as an unfitting one is deleted. In addition, in the case in which the presented content group does not include such a content that is determined as one to be included by the user, the content determined as a fitting one is added.

In other words, the process in Step S133 is the process for reflecting what content the user desires as the content to be searched according to the evaluation axis selected by the user. To this end, the following process is performed; in the case in which the content desired to be present according to the selected evaluation axis is not presented, this content is added to the presented content group, whereas in the case in which the content desired not to be presented is presented, this content is deleted from the presented content group.

With performing such a process, when the search process according to the evaluation axis selected by the user is performed, the content group desired as the search result by the user is selected. In this state, in Step S134, an evaluation axis is again computed. The evaluation axis computing process performed in Step S134 is performed in the process in the flow chart shown in FIG. 10, omitting the descriptions. However, in the evaluation axis computing process in Step S134, only the contents included in the content group at the time at which the process in Step S133 is finished are the processing targets.

In Step S135, it is determined whether the evaluation axis is successfully recomputed. For example, this determination can be performed by the following process in which the evaluation axis that is the recomputed result is used to again perform the search process for determining whether only the content group specified by the user is searched (the contents remaining at the time at which the process in Step S133 is finished).

In Step S135, if it is determined that the evaluation axis is not successfully recomputed, the process returns to Step S134, and an evaluation axis is again computed. At this time, for example, the feature volume to be mapped is changed to a feature volume different from the feature volume used in computing the evaluation axis in the previous process to make sure that a suitable evaluation axis is computed.

On the other hand, in Step S135, if it is determined that the evaluation axis is successfully recomputed, the evaluation axis modifying process is ended. Then, the modified evaluation axis is stored in the evaluation axis storage part 35 instead of the evaluation axis before modified.

Figure 15:
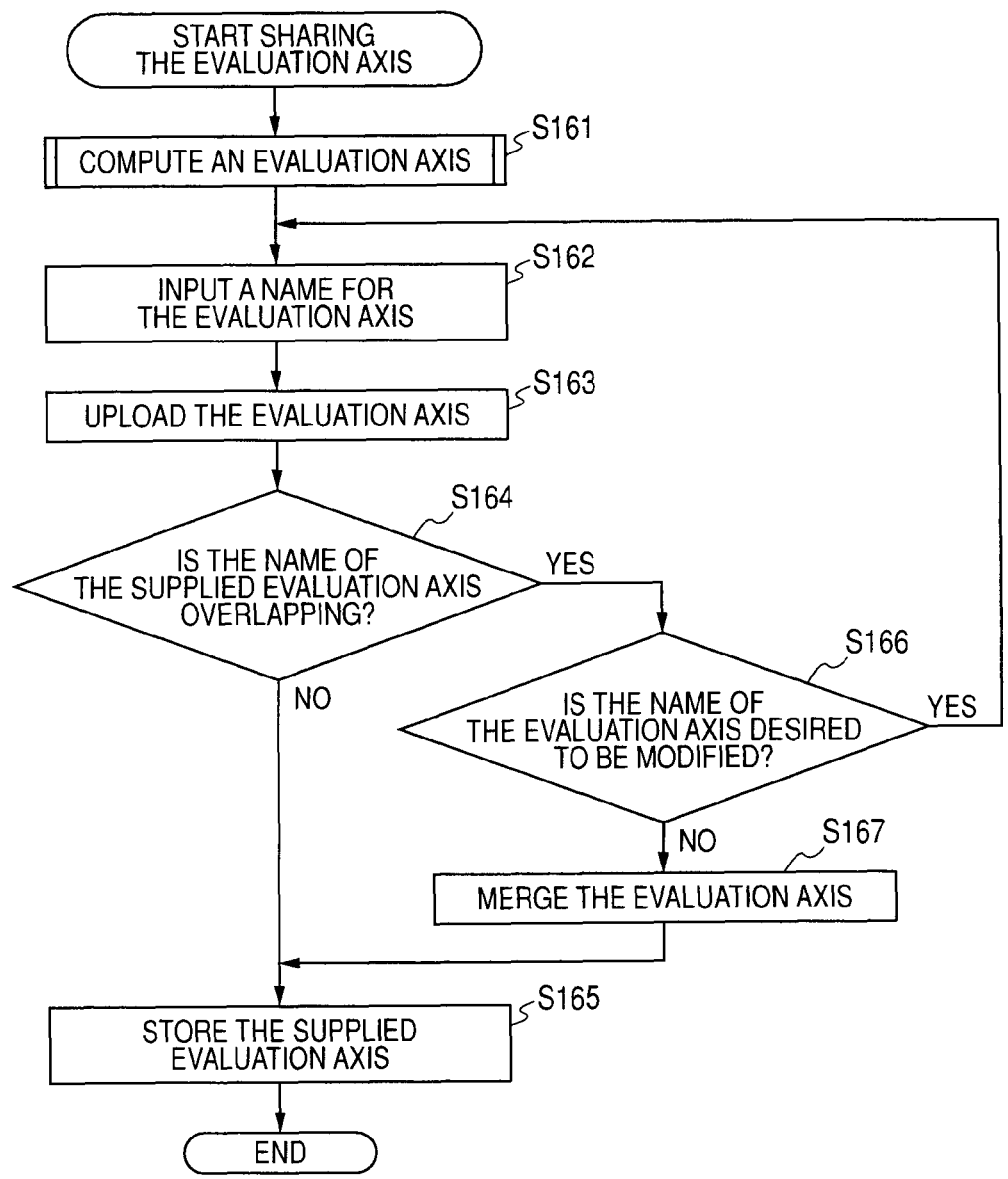
FIG. 15 shows a flow chart illustrative of sharing the evaluation axis.

As discussed above, a user can modify the evaluation axis. In addition, as discussed above, the evaluation axis is modified to compute the evaluation axis for suitably searching for a content desired by a user. As described above, the evaluation axis that can perform the search process highly suitably can be shared with the other users. Next, sharing the evaluation axis will be described with reference to a flow chart shown in FIG. 15.

In Step S161, an evaluation axis is computed. The process in Step S161 has been described with reference to the flow chart shown in FIG. 10, omitting the descriptions. In addition, the process in Step S161 may be omitted. In other words, since the evaluation axis is already computed and stored in the evaluation axis storage part 35, the stored evaluation axis may be a processing target.

In Step S162, a name is given to the computed evaluation axis. With the use of an evaluation axes already stored, this process can be omitted because the evaluation axis has a name and stored as the evaluation axis is associated with that name.

In Step S163, the evaluation axis is uploaded. The evaluation axis with the name is supplied to the shared evaluation axis server 13 together with the name over the network 11 to start sharing the evaluation axis. The process so far is performed on the PC 12 side.

The evaluation axis receiving part 71 of the shared evaluation axis server 13 receives the evaluation axis supplied from the PC 12 and the name given to the evaluation axis. The received evaluation axis and the name are supplied to the evaluation axis reevaluating part 72. In Step S164, the evaluation axis reevaluating part 72 determines whether the name of the supplied evaluation axis is already registered.

The shared evaluation axis server 13 has the evaluation axis sharing part 73, and a plurality of evaluation axes and names is stored therein as they are associated with each other. The evaluation axis reevaluating part 72 compares the name of the supplied evaluation axis with the names of the evaluation axes stored in the evaluation axis sharing part 73, and determines whether the same name is already stored in the evaluation axis sharing part 73.

In addition, although it is described that the same name is a search target, in addition to the identical name, for example, similar names and semantically the same names may be search targets. For example, such a configuration may be possible that the evaluation axis reevaluating part 72 is provided with a database such as a thesaurus in which the name similar to the supplied name is decided by referring to the database such as a thesaurus, and the decided similar name is also included as a search target.

In Step S164, if it is determined that the name of the evaluation axis is not overlapping, the process goes to Step S165, and the supplied evaluation axis is associated with the name of the evaluation axis and supplied and stored in the evaluation axis sharing part 73.

On the other hand, in Step S164, if it is determined that the name of the evaluation axis is overlapping, the process goes to Step S166. In Step S166, it is determined whether the name of the evaluation axis is modified. For example, since the evaluation axis having the same name is already stored, a message is sent to the user having supplied the evaluation axis whether a new name is given to the evaluation axis and again registered. If a reply to the message is received from the user that a new name is given, in Step S166, it is determined that the name of the evaluation axis is modified. On the other hand, if a reply to the message is received from the user that a new name is not given, in Step S166, it is determined that the name of the evaluation axis is not modified.

In Step S166, if it is determined that the name of the evaluation axis is changed, the process returns to Step S162, and the processes after that are repeated. On the other hand, in Step S166, if it is determined that the name of the evaluation axis is not changed, the process goes to Step S167. In the case in which the process goes to Step S167, the evaluation axis sharing part 73 has the evaluation axis with the same name already stored therein. Thus, when the name of the evaluation axis is registered with no change, a plurality of evaluation axes with the same name can be registered. Then, when the evaluation axis with the same name is newly added and registered, such a process is performed that the evaluation axis with the same name already registered and the supplied evaluation axis are merged into a single evaluation axis.

In Step S167, the evaluation axis is merged. In other words, the evaluation axis already stored and the uploaded evaluation axis are merged. As described above, for example, since the evaluation axis is configured of the parameters of the equation expressing the hyperplane, the mean value of the parameter is computed to merge the evaluation axis. Of course, the evaluation axis may be merged by the scheme other than the mean value. For the scheme of merge, such a method is preferable that the evaluation axis can be modified so as to suitably classify a predetermined content. In other words, such a method is preferable that the evaluation axis is modified to an evaluation axis which can perform a search process in which only the content fitting for the name of the evaluation axis is presented to the user side.

In addition, in the case in which the evaluation axis already stored and the uploaded evaluation axis are greatly different from each other when merged, it is likely that they are merged into a single evaluation axis to unsuitably classify contents. It is likely that merging the evaluation axes into a single evaluation axis does not achieve a suitable classification. Thus, in the case in which the evaluation axis already stored and the uploaded evaluation axis are greatly different from each other, such a process may be performed that a warning is sent to the user having uploaded the evaluation axis that the uploaded one is not suitable to the evaluation axis. Then, in this case, the merging process may not be performed. Moreover, the uploaded evaluation axis may be discarded.

The evaluation axis modified in the process in Step S167 is stored in the evaluation axis sharing part 73. As discussed above, the evaluation axes with the same name are merged into a single evaluation axis. In addition, the same evaluation axes with the name are merged into a single evaluation axis, whereby such an evaluation axis can be created that the content fitting for the name given to the evaluation axis can be searched.

As described above, the evaluation axis is computed, modified, shared and used in making a search, whereby the following advantages can be expected. In other words, first, once an evaluation axis (tag) is given to a predetermined content or a predetermined content group, the essence of that tag can be evaluated for a content acquired after that and a content shared over the Internet, and then a search for a favorite content can be facilitated.

In addition, since the evaluation axis once computed can be applied to all the contents, it is unnecessary to perform such a process that the same evaluation axis is manually applied again and again to the other contents. In other words, the evaluation axis once computed is shared to eliminate the necessity to again compute this evaluation axis, and processing done by a large number of users can be omitted. Thus, the user's efforts can be eliminated.

In addition, a search is not a choice between two things whether the evaluation of the evaluation axis is matched or not, and a more flexible search can be conducted. In addition, the evaluation axis computed by other users can be shared, and a content search can be conducted according to the viewpoint (the evaluation axis (the name of the evaluation axis)) that a user does not recognize.

In addition, in the embodiment described above, it is described that the evaluation axis is computed on the PC 12. For example, the embodiment of the invention can be adapted to a hard disk recorder that stores contents therein.

In addition, in the embodiment described above, the evaluation axis is computed from the feature volume of the content selected by a user. However, the evaluation axis may be computed from the feature volume of the content not selected by a user. In the case in which the evaluation axis is computed from the feature volume of the content not selected by a user, such an evaluation axis can be computed that contents are classified into a content undesired by a user and a content desired by a user.

Therefore, for example, an evaluation axis may be found from the feature volume of the content not selected by a user in the following cases: in the case in which the number of contents not selected by a user is greater than the number of contents selected by the user, and in the case in which it is preferable to compute an evaluation axis from many samples. In other words, such a scheme may be provided that the evaluation axis is computed by switching between the feature volume of the content selected by a user and the feature volume of the content not selected by a user depending on information such as the number of contents selected by the user as necessary.

2. Recording Medium

A sequence of the process steps described above may be executed by hardware, or may be executed by software. In the case in which a series of the process steps is executed by software, a program configuring the software is installed in a computer incorporated in a dedicated hardware, or is installed from a program recording medium to a multi-purpose personal computer, for example, that can run various functions by installing various programs.

Figure 16:
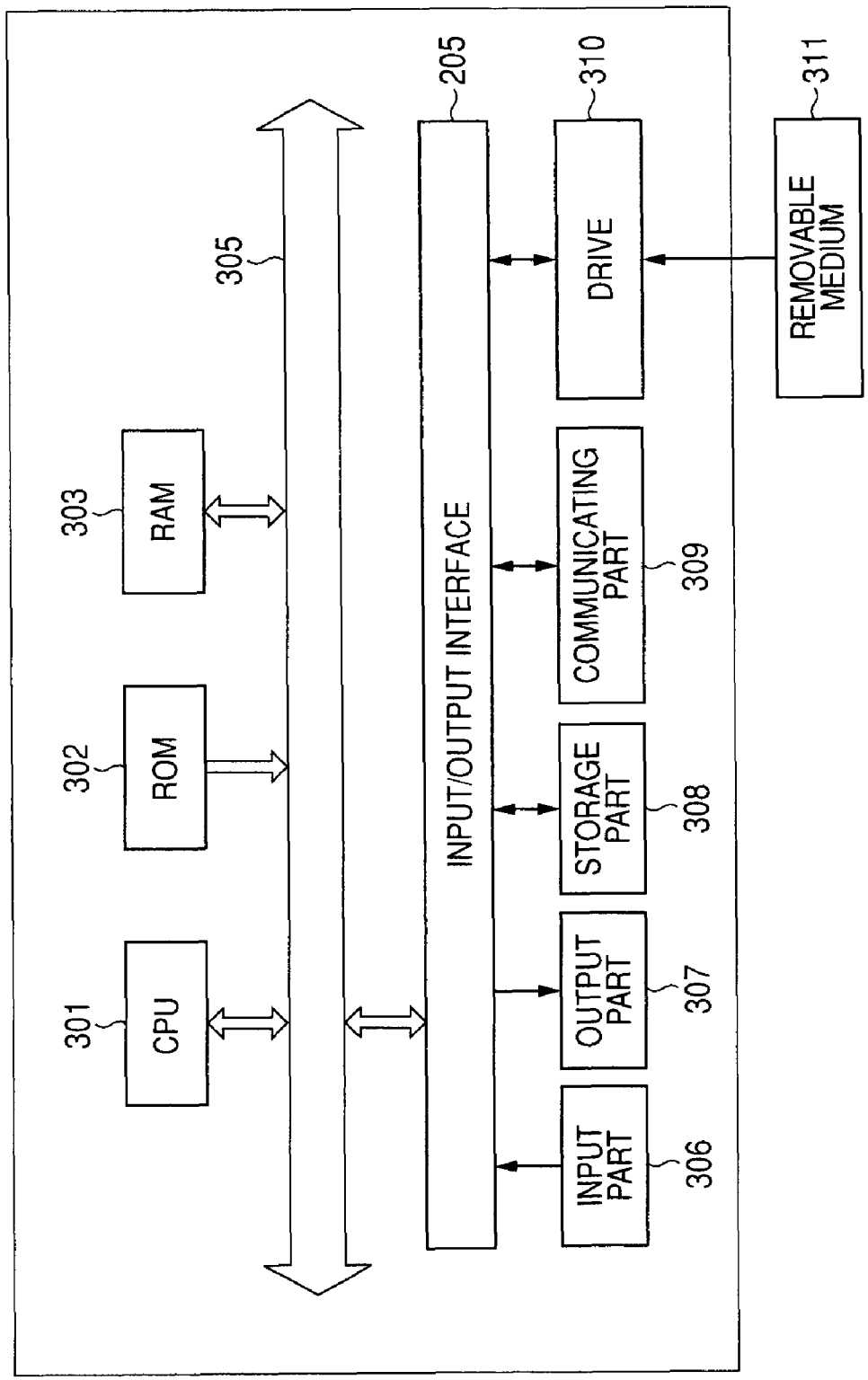
FIG. 16 shows a diagram illustrative of a recording medium.

FIG. 16 shows a block diagram depicting an exemplary hardware configuration of a personal computer which executes a sequence of process steps according to a program.

In the computer, a CPU (Central Processing Unit) 301, a ROM (Read Only Memory) 302, and a RAM (Random Access Memory) 303 are connected to each other through a bus 305.

To the bus 305, an input/output interface 205 is further connected. To the input/output interface 205, the following components are connected: an input part 306 formed of a keyboard, a mouse, and a microphone, an output part 307 formed of a display and a speaker, a storage part 308 formed of a hard disk and a non-volatile memory, a communicating part 309 formed of a network interface, and a drive 310 that drives a removable medium 311 such as a magnetic disk, an optical disk, a magneto-optical disk, or a semiconductor memory.

In the computer thus configured, for example, the CPU 301 loads a program stored in the storage part 308 to the RAM 303 through the input/output interface 205 and the bus 305, whereby the sequence of process steps are performed.

For example, the program executed by the computer (the CPU 301) is distributed by being recorded on the removable medium 311 that is a package medium such as a magnetic disk (including a flexible disk), an optical disk (CD-ROM (Compact Disc-Read Only Memory), DVD (Digital Versatile Disc) and so on), a magneto-optical disk, or a semiconductor memory, or over a cable or wireless transmission medium such as a local area network, the Internet, and digital satellite broadcasting.

Then, the program can be installed in the storage part 308 through the input/output interface 205 by mounting the removable medium 311 on the drive 310. In addition, the program can be received by the communicating part 309 over a cable or wireless transmission medium and installed in the storage part 308. In addition to this, the program can be installed in the ROM 302 or the storage part 308 in advance.

In addition, the program executed by the computer may be a program in which the process steps are performed in a time series in order described in the specification, or a program in which the process steps are performed in parallel or at a necessary timing at which the program is called. Moreover, the invention is not limited to the embodiments described above, which can be modified within the scope not deviating from the teaching of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   a computer system; and
   at least one memory comprising software processes executed by the computer system, wherein the software processes are configured to include:

an extracting means for extracting a feature volume from a predetermined content; and a computing means for computing an evaluation axis that classifies a first content and a second content by using a first feature volume extracted from the first content by the extracting means, or a second feature volume extracted from the second content by the extracting means, wherein when a plurality of content is classified according to the evaluation axis, an unfitting content found in the classified content is deleted from the classified content, and a fitting content found but not included in the classified content is added to the classified content, and wherein, as the result of the deletion and addition of content, a new evaluation axis is computed from a plurality of content remaining as a classified result for modifying the evaluation axis.

2. The information processing apparatus according to claim 1, wherein the computing means maps the first feature volume or the second feature volume, finds from the mapped feature volume an equation of a hyperplane separating the first content from the second content, and sets parameters of the equation to the evaluation axis.

3. The information processing apparatus according to claim 1, wherein the evaluation axis computed by the computing means is stored in association with a name indicating a content to be classified according to the evaluation axis.

4. The information processing apparatus according to claim 3, wherein the evaluation axis computed by the computing means is used in searching through a plurality of content for a content indicated by the name.

5. The information processing apparatus according to claim 4, wherein a content with a high relevance ratio to the evaluation axis is a search result among searched content.

6. The information processing apparatus according to claim 1, wherein the evaluation axis is modified by being merged with a different evaluation axis.

7. The information processing apparatus according to claim 6, wherein the different evaluation axis is an evaluation axis associated with the same name as the name associated with the evaluation axis computed by the computing means.

8. An information processing method comprising the steps of:

extracting a feature volume from a predetermined content; and computing an evaluation axis that classifies a first content and a second content by using a first feature volume extracted from the first content, or a second feature volume extracted from the second content wherein when a plurality of content is classified according to the computed evaluation axis, an unfitting content found in the classified content is deleted from the classified content, and a fitting content found but not included in the classified content is added to the classified content, and wherein as the result of the deletion and addition of content, a new evaluation axis is computed from a plurality of content remaining as a classified result for modifying the evaluation axis.

9. A non-transitory computer-readable medium on which is stored a set of instructions for processing information at an information processing apparatus that, when executed by a computer, performs a process comprising the steps of:

extracting a feature volume from a predetermined content; and computing an evaluation axis that classifies a first content and a second content by using a first feature volume extracted from the first content, or a second feature volume extracted from the second content, wherein when a plurality of content is classified according to the computed evaluation axis, an unfitting content found in the classified content is deleted from the classified content, and a fitting content found but not included in the classified content is added to the classified content, and wherein as the result of the deletion and addition of content, a new evaluation axis is computed from a plurality of content remaining as a classified result for modifying the evaluation axis.

10. The information processing method according to claim 8, wherein the computing step further comprises mapping the first feature volume or the second feature volume, finding from the mapped feature volume an equation of a hyperplane separating the first content from the second content, and setting parameters of the equation to the evaluation axis.

11. The information processing method according to claim 8, wherein the evaluation axis computed in the computing step is stored in association with a name indicating a content to be classified according to the evaluation axis.

12. The information processing method according to claim 11, wherein the evaluation axis computed in the computing step is used in searching through a plurality of content for a content indicated by the name.

13. The information processing method according to claim 12, wherein a content with a high relevance ratio to the evaluation axis is a search result among searched content.

14. The information processing method according to claim 8, wherein the evaluation axis is modified by being merged with a different evaluation axis.

15. The information processing method according to claim 14, wherein the different evaluation axis is an evaluation axis associated with the same name as the name associated with the evaluation axis computed by the computing means.

* * * * *